United States Patent
Shibuno et al.

(10) Patent No.: US 8,542,989 B2
(45) Date of Patent: Sep. 24, 2013

(54) CAMERA SYSTEM, CAMERA BODY AND INTERCHANGEABLE LENS

(75) Inventors: Koji Shibuno, Osaka (JP); Mitsuyoshi Okamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/992,323

(22) PCT Filed: May 15, 2009

(86) PCT No.: PCT/JP2009/002162
§ 371 (c)(1),
(2), (4) Date: Nov. 12, 2010

(87) PCT Pub. No.: WO2009/139192
PCT Pub. Date: Nov. 19, 2009

(65) Prior Publication Data
US 2011/0064397 A1     Mar. 17, 2011

(30) Foreign Application Priority Data
May 15, 2008  (JP) .................................. 2008-128010

(51) Int. Cl.
*G03B 13/10* (2006.01)
*G03B 13/36* (2006.01)

(52) U.S. Cl.
USPC ............................... 396/133; 396/89; 396/93

(58) Field of Classification Search
CPC ........ G03B 13/22; G03B 13/10; G03B 13/36; G02B 7/08
USPC ........................................ 396/89, 91, 93, 133
See application file for complete search history.

(56) References Cited

U.S. PATENT DOCUMENTS

| | | | |
|---|---|---|---|
| 5,060,005 A | 10/1991 | Itoh et al. | |
| 5,457,513 A * | 10/1995 | Uenaka | 396/95 |
| 5,463,442 A | 10/1995 | Harigaya et al. | |

(Continued)

FOREIGN PATENT DOCUMENTS

| | | |
|---|---|---|
| JP | 61-270882 | 12/1986 |
| JP | 6-183109 | 7/1994 |

(Continued)

OTHER PUBLICATIONS

International Search Report of PCT Application No. PCT/JP2009/002162 dated Aug. 11, 2009.

(Continued)

*Primary Examiner* — Clayton E Laballe
*Assistant Examiner* — Kevin Butler
(74) *Attorney, Agent, or Firm* — Panasonic Patent Center

(57) ABSTRACT

A camera system (1) includes an interchangeable lens (200) and a camera body (100). The camera body (100) includes a body controller (140) configured to generate a command, and a sending unit (150) configured to send the generated command to the interchangeable lens. The interchangeable lens (200) includes a movable member (230, 260), a driving unit (233, 261) configured to drive the movable member, a receiving unit (250) configured to receive a command from the camera body, and a lens controller (240) configured to control the driving unit according to the received command. Further, a prediction unit (140, 240) is provided in either one of the camera body and the interchangeable lens, which predicts whether an operation of the driving unit of the interchangeable lens according to the received command will be completed within a predetermined time.

12 Claims, 5 Drawing Sheets

(56) References Cited

U.S. PATENT DOCUMENTS

| | | | |
|---|---|---|---|
| 5,485,208 A * | 1/1996 | Mabuchi et al. | 348/335 |
| 5,604,560 A * | 2/1997 | Kaneda | 396/133 |
| 5,839,002 A * | 11/1998 | Miyake et al. | 396/91 |
| 6,128,443 A * | 10/2000 | Higuma | 396/91 |
| 7,467,900 B2 * | 12/2008 | Higuma | 396/529 |
| 8,098,323 B2 * | 1/2012 | Yumiki et al. | 348/360 |
| 2002/0047912 A1 * | 4/2002 | Mabuchi et al. | 348/345 |
| 2006/0171707 A1 * | 8/2006 | Higuma | 396/529 |
| 2007/0058971 A1 | 3/2007 | Tsuda | |
| 2007/0269197 A1 | 11/2007 | Ide et al. | |
| 2008/0007644 A1 | 1/2008 | Matsumoto | |
| 2008/0199169 A1 * | 8/2008 | Yoshida | 396/95 |
| 2008/0199174 A1 * | 8/2008 | Yoshida | 396/257 |
| 2008/0267601 A1 * | 10/2008 | Kobayashi | 396/91 |
| 2009/0174806 A1 * | 7/2009 | Utagawa | 348/345 |
| 2009/0262235 A1 * | 10/2009 | Kawazoe et al. | 348/345 |
| 2010/0209097 A1 * | 8/2010 | Sasaki et al. | 396/529 |
| 2011/0052176 A1 * | 3/2011 | Yoshida | 396/257 |
| 2011/0063497 A1 * | 3/2011 | Kawazoe et al. | 348/373 |
| 2011/0110656 A1 * | 5/2011 | Hamada | 396/133 |
| 2011/0141340 A1 * | 6/2011 | Yumiki et al. | 348/345 |
| 2012/0182462 A1 * | 7/2012 | Hamada | 348/352 |

FOREIGN PATENT DOCUMENTS

| | | | |
|---|---|---|---|
| JP | 8-50229 | | 2/1996 |
| JP | 1996-050229 | * | 2/1996 |
| JP | 2007-310009 | | 11/2007 |
| JP | 2007-322922 | | 12/2007 |
| JP | 2008-15274 | | 1/2008 |
| JP | 2008-276131 | | 11/2008 |

OTHER PUBLICATIONS

Translation of the International Preliminary Report on Patentability (PCT/IB/338) mailed on Jan. 20, 2011 with PCT/IB/373 & PCT/ISA/237 for corresponding application PCT/JP2009/002162.

The Extended European Search Report of EP Application No. 09746399.6, dated Jun. 5, 2012.

* cited by examiner

CAMERA SYSTEM, CAMERA BODY AND INTERCHANGEABLE LENS

TECHNICAL FIELD

The present invention relates to a camera system and more particularly to a camera system including an interchangeable lens and a camera body.

BACKGROUND ART

Patent Document 1 discloses a camera system configured by a camera body and an interchangeable lens. The camera system performs autofocus control by the camera body sending an instruction to control drive of the interchangeable lens to the interchangeable lens.

PRIOR ART DOCUMENTS

Patent Documents

Patent Document 1: JP2007-322922A

DISCLOSURE OF INVENTION

Problems to be Solved by the Invention

In an interchangeable lens, not only autofocus control but also various controls need to be performed by a camera body and thus there is a demand for technical development for shifting from autofocus control to another control.

Patent Document 1 does not disclose at all a technique used for a shift from autofocus control to another control.

An object of the present invention is to provide a camera system capable of smoothly performing a shift from drive control of a movable member in an interchangeable lens to another control in the camera system.

Means for Solving the Problems

In a first aspect, a camera system including an interchangeable lens and a camera body is provided. The camera body includes a body controller configured to generate a command, and a sending unit configured to send the generated command to the interchangeable lens. The interchangeable lens includes a movable member, a driving unit configured to drive the movable member, a receiving unit configured to receive a command from the camera body, and a lens controller configured to control the driving unit according the received command. Further, a prediction unit is provided in either one of the camera body and the interchangeable lens, and the prediction unit predicts whether an operation of the driving unit of the interchangeable lens according to the received command will be completed within a predetermined time.

In a second aspect, a camera body to which an interchangeable lens having a movable member and a driving unit that drives the movable member is mountable is provided. The camera body includes a body controller configured to generate a command, a sending unit configured to send the generated command to the interchangeable lens, and a receiving unit configured to receive, from the interchangeable lens, information indicating whether an operation, of the driving unit, which is performed according to the sent command in the interchangeable lens will be completed within a predetermined time.

In a third aspect, an interchangeable lens mountable to a camera body is provided. The interchangeable lens includes a movable member, a driving unit configured to drive the movable member, a receiving unit configured to receive a command from the camera body, a lens controller configured to control the driving unit according to the received command, a prediction unit configured to predict whether an operation, of the driving unit, which is performed according to the received command will be completed within a predetermined time, and a sending unit configured to send a result of the prediction to the camera body.

In a fourth aspect, a camera body to which an interchangeable lens having a movable member and a driving unit that drives the movable member is mountable is provided. The camera body includes a body controller configured to generate a command, a sending unit configured to send the generated command to the interchangeable lens, a receiving unit configured to receive a state of the movable member from the interchangeable lens, and a prediction unit configured to predict, based on the state of the movable member, whether an operation, of the driving unit of the interchangeable lens, which is performed according to the sent command will be completed within a predetermined time.

In a fifth aspect, a camera system including an interchangeable lens and a camera body is provided. The camera body includes a body controller configured to generate a synchronizing signal and a command, and a sending unit configured to send the generated synchronizing signal and command to the interchangeable lens. The interchangeable lens includes a movable member, a driving unit configured to drive the movable member, a receiving unit configured to receive the synchronizing signal and the command from the camera body, a lens controller configured to control the driving unit according to the received command in synchronization with the received synchronizing signal, and a prediction unit configured to predict whether an operation, of the driving unit, which is performed according to the received command will be completed within a predetermined time. The lens controller sends a prediction result obtained by the prediction unit to the camera body. The prediction result is information indicating a number of cycles of the synchronizing signal required to complete the operation, of the driving unit, which is performed according to the received command.

Effect of the Invention

According to the present invention, there can be provided a camera system capable of smoothly performing a shift from drive control of a movable member in an interchangeable lens to another control in the camera system.

BEST MODE FOR CARRYING OUT THE INVENTION

1. First Embodiment

A first embodiment in which the present invention is applied to a lens interchangeable type camera system will be described below with reference to the drawings.

1-1. Configuration

1-1-1. Summary

Figure 1:
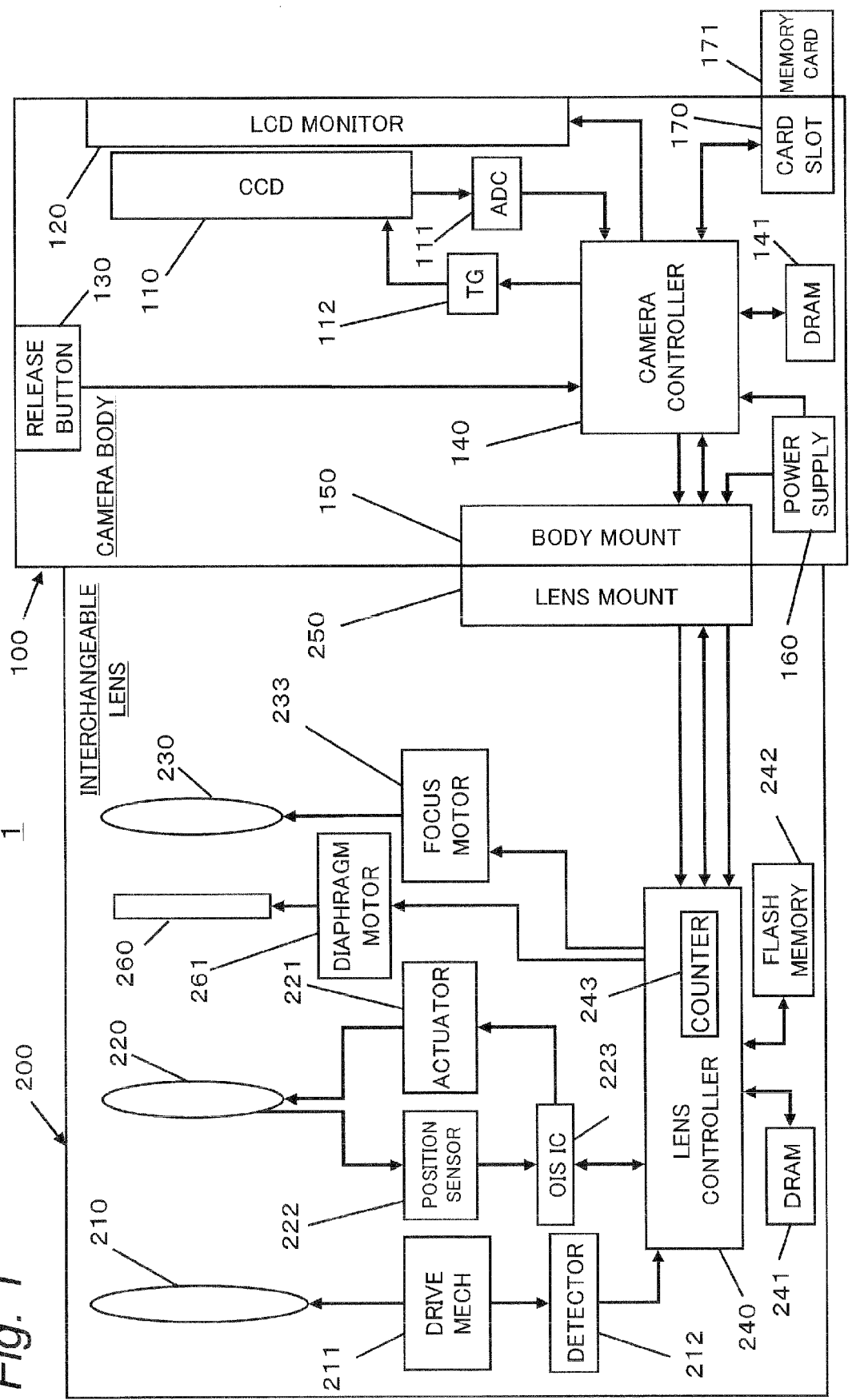
FIG. 1 is a block diagram of a camera system 1.

FIG. 1 is a block diagram showing a configuration of a camera system 1 according to the first embodiment of the present invention. The camera system 1 is configured by a camera body 100 and an interchangeable lens 200 mountable to the camera body 100. The camera system 1 can perform autofocus control by driving a focus lens 230. The camera system 1 can also perform aperture control by driving a diaphragm 260. The present embodiment describes below a configuration for smoothly performing a shift from control to drive a movable member, such as autofocus control or aperture control, to another control in a lens interchangeable type camera system.

1-1-2. Configuration of Camera Body

The camera body 100 includes a CCD image sensor 110, a liquid crystal display monitor 120, a camera controller 140, a body mount 150, a power supply 160, and a card slot 170.

The camera controller 140 controls the entire camera system 1 by controlling components such as the CCD image sensor 110 according to an instruction from an operation member such as a release button 130. The camera controller 140 sends a vertical synchronizing signal to a timing generator 112. In parallel with this, the camera controller 140 generates an exposure synchronizing signal based on the vertical synchronizing signal. The camera controller 140 periodically sends the generated exposure synchronizing signal to a lens controller 240 through the body mount 150 and a lens mount 250. The camera controller 140 uses a DRAM 141 as a work memory when performing a control operation or image processing operation.

The CCD image sensor 110 captures a subject image incident thereon through the interchangeable lens 200 to generate image data. The generated image data is digitized by an AD converter ill. The image data digitized by the AD converter 111 is subjected to predetermined image processing by the camera controller 140. The predetermined image processing includes, for example, a gamma correction process, a white balance correction process, a flaw correction process, a YC conversion process, an electronic zoom process, and a JPEG compression process.

The CCD image sensor 110 operates at timing controlled by the timing generator 112. The operations of the CCD image sensor 110 include a still image capturing operation, a through image capturing operation, and the like. A through image is mainly a moving image and is displayed on the liquid crystal display monitor 120 for allowing a user to determine a composition for taking a still image.

The liquid crystal display monitor 120 displays an image based on image data for display having been subjected to image processing by the camera controller 140. The liquid crystal monitor 120 can selectively display a moving image or a still image.

The card slot 170 allows a memory card 171 to be inserted thereinto, and controls the memory card 171 based on control by the camera controller 140. The memory card 171 can store image data generated by image processing by the camera controller 140. For example, the memory card 171 can store JPEG image files. Image data or an image file stored in the memory card 171 can be read, and the image data or image file read from the memory card 171 is subjected to image processing by the camera controller 140. For example, the camera controller 140 decompresses image data or an image file obtained from the memory card 171 to generate image data for display.

The power supply 160 supplies power to be consumed by the camera system 1. The power supply 160 may be, for example, a dry battery or rechargeable battery. Alternatively, the power supply 160 may supply power to the camera system 1 from an external source through a power cord.

The body mount 150 can be mechanically and electrically connected to the lens mount 250 of the interchangeable lens 200. The body mount 150 can send and receive data to/from the interchangeable lens 200 through the lens mount 250. The body mount 150 sends an exposure synchronizing signal received from the camera controller 140, to the lens controller 240 through the lens mount 250. The body mount 150 also sends other control signals received from the camera controller 140, to the lens controller 240 through the lens mount 250. For example, the body mount 150 sends information about the drive of the focus lens 230 received from the camera controller 140, to the lens controller 240 through the lens mount 250. The body mount 150 also sends signals received from the lens controller 240 through the lens mount 250, to the camera controller 140. For example, the body mount 150 sends, to the camera controller 140, a completion announcement signal announcing completion of movement of the focus lens 230 which is received from the lens controller 240 through the lens mount 250. Moreover, the body mount 150 supplies power received from the power supply 160, to the entire interchangeable lens 200 through the lens mount 250.

1-1-3. Configuration of Interchangeable Lens

The interchangeable lens 200 includes an optical system, the lens controller 240, and the lens mount 250. The optical system includes a zoom lens 210, an OIS lens 220, the diaphragm 260, and the focus lens 230.

The zoom lens 210 is a lens for changing the magnification of a subject image formed by the optical system. The zoom lens 210 is configured by one or a plurality of lenses. A drive mechanism 211 includes a zoom ring operable by the user, and the like, and transmits an operation performed by the user to the zoom lens 210 to move the zoom lens 210 along an optical axis of the optical system. A detector 212 detects an amount of drive of the drive mechanism 211. The lens controller 240 obtains a detection result obtained by the detector 212 and can thereby grasp the zoom magnification of the optical system.

The OIS lens 220 is a lens for correcting a shake of a subject image formed by the optical system of the interchangeable lens 200. The OIS lens 220 reduces a shake of a subject image on the CCD image sensor 110 by moving in a direction in which a shake of the camera system 1 is compensated for. The OIS lens 220 is configured by one or a plurality of lenses. An actuator 221 drives the OIS lens 220 in a plane perpendicular to an optical axis of the optical system under control of an OIS IC 223. The actuator 221 can be implemented by, for example, a magnet and a planar coil. A position detection sensor 222 is a sensor that detects a position of the OIS lens 220 in the plane perpendicular to the optical axis of the optical system. The position detection sensor 222 can be implemented by, for example, a magnet and a Hall element. The OIS IC 223 controls the actuator 221 based on a detection result obtained by the position detection sensor 222 and a detection result obtained by a camera shake sensor such as a gyro sensor. The OIS IC 223 obtains the detection result obtained by the camera shake sensor, from the lens controller 240. In addition, the OIS IC 223 sends a signal indicating a state of a processor for optically correcting image shake to the lens controller 240.

The diaphragm 260 is a member for regulating an amount of light passing through the optical system. The diaphragm 260 includes, for example, a plurality of diaphragm blades and can regulate the amount of light by opening and closing an opening formed by the blades. A diaphragm motor 261 is drive means of opening and closing the opening of the diaphragm 260.

The focus lens 230 is a lens for changing a focus state of a subject image formed on the CCD image sensor 110 by the optical system. The focus lens 230 is configured by one or a plurality of lenses.

A focus motor 233 drives the focus lens 230 to move back and forth along the optical axis of the optical system, based on control of the lens controller 240. In this manner, the focus state of a subject image formed on the CCD image sensor 110 by the optical system can be changed. In the first embodiment, a stepping motor is used as the focus motor 233. Note, however, that the present invention is not limited thereto. In a word, any lens driving apparatus may be used as long as it can move the focus lens 230 by a predetermined amount within a predetermined time. Since the focus motor 233 is thus configured by a stepping motor, the lens controller 240 can detect an amount of drive of the focus lens 230 by counting the number of pulse signals sent therefrom by a counter 243.

The lens controller 240 controls the entire interchangeable lens 200 such as the CIS IC 223 and the focus motor 233, based on control signals from the camera controller 140. For example, the lens controller 240 controls the focus motor 233 to move the focus lens 230 back and forth along the optical axis by a predetermined drive method, based on a control signal from the camera controller 140. Moreover, the lens controller 240 receives signals from the detector 212, the OIS IC 223, and the like, and sends the signals to the camera controller 140. The lens controller 240 performs sending and receiving with the camera controller 140 through the lens mount 250 and the body mount 150.

The lens controller 240 uses a DRAM 241 as a work memory during control. A flash memory 242 stores a program and parameters used for control by the lens controller 240.

1-1-4. Term Correspondence

The camera controller 140 is an example of a body controller. The body mount 150 is an example of a sending unit and a receiving unit. The focus lens 230 and the diaphragm 260 are each an example of a movable member. The focus motor 233 and the diaphragm motor 261 are each an example of a driving unit. The lens mount 250 is an example of a receiving unit and a sending unit. The lens controller 240 is an example of a lens controller. The camera controller 140 and the lens controller 240 are an example of a prediction unit.

1-2. Operation 1-2-1. Image Capturing Preparation Operation

Figure 2:
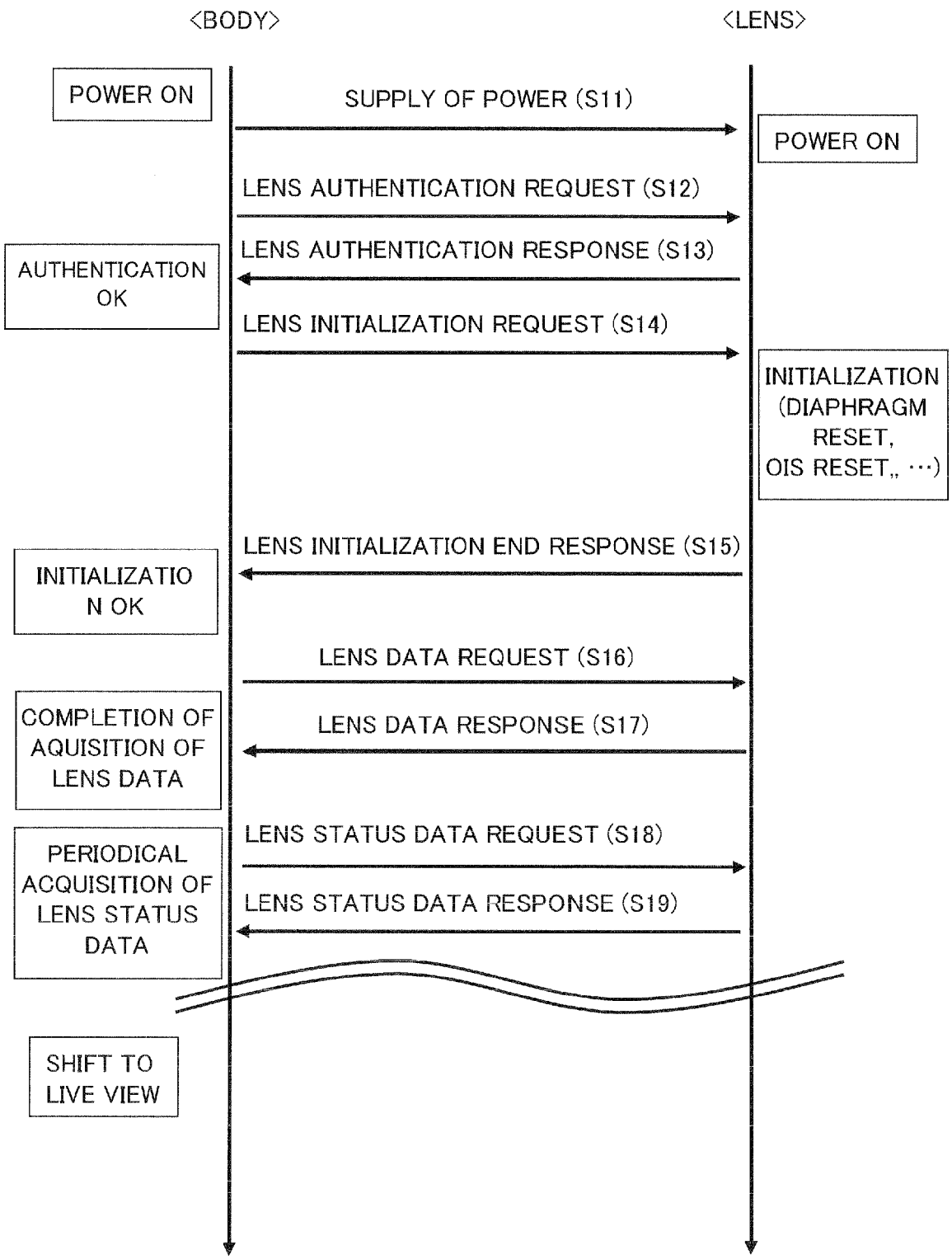
FIG. 2 is a chart for describing an image capturing preparation operation.

First, the operation of the camera system 1 for image capturing preparation will be described. FIG. 2 is a diagram showing sending and receiving of signals to describe the image capturing preparation operation of the camera system 1.

When the user turns on the camera body 100 with the interchangeable lens 200 being mounted to the camera body 100, the power supply 160 supplies power to the interchangeable lens 200 through the body mount 150 and the lens mount 250 (S11). Then, the camera controller 140 requests authentication information of the interchangeable lens 200 from the lens controller 240 (S12). In this case, the authentication information of the interchangeable lens 200 includes information indicating whether the interchangeable lens 200 is mounted and information indicating whether an accessory is attached. The lens controller 240 responds to the lens authentication request from the camera controller 140 (S13).

Subsequently, the camera controller 140 requests the lens controller 240 to perform an initialization operation (S14). In response to this, the lens controller 240 performs an initialization operation, such as resetting of the diaphragm and resetting of the OIS lens 220. The lens controller 240 then sends a response indicating that the lens initialization operation has been completed, to the camera controller 140 (S15).

Then, the camera controller 140 requests the lens controller 240 for lens data (S16). The lens data is stored in the flash memory 242. Hence, the lens controller 240 reads the lens data from the flash memory 242 and sends, as a response, the lens data to the camera controller 140 (S17). In this case, the lens data includes characteristic values unique to the interchangeable lens 200, such as a lens name, F-number, and a focal length.

When the camera controller 140 grasps the lens data of the interchangeable lens 200 mounted to the camera body 100, the camera system 1 goes into a state that an image can be captured. In this state, the camera controller 140 periodically requests lens state data indicating a state of the interchangeable lens 200 from the lens controller 240 (S18). The lens state data includes, for example, zoom magnification information by the zoom lens 210, position information of the focus lens 230, and aperture value information. In response to this request, the lens controller 240 sends, as a response, the requested lens state data to the camera controller 140 (S19).

1-2-2. Autofocus Control and Aperture Control

Autofocus control and aperture control of the camera system 1 which completes the image capturing preparation in the above-described manner will be described with reference to FIGS. 3 to 5. In the present embodiment, first, autofocus control is performed and subsequently aperture control is performed.

1-2-2-1. Autofocus Control

Autofocus control of the camera system 1 will be described with reference to a flowchart in FIG. 3 and FIG. 5. Note that the camera system 1 adopts autofocus control by a contrast method (so-called hill-climbing method). The case will be described in which, in autofocus control by the contrast scheme, after the camera body 100 detects a focus position of the focus lens 230, the focus lens 230 is moved to the focus position. Note that a method of detecting a focus position of a focus lens for a lens interchangeable type camera system performing autofocus control by the contrast method is generally known (see, for example, JP2007-322922A) and thus description thereof is not given herein.

Figure 3:
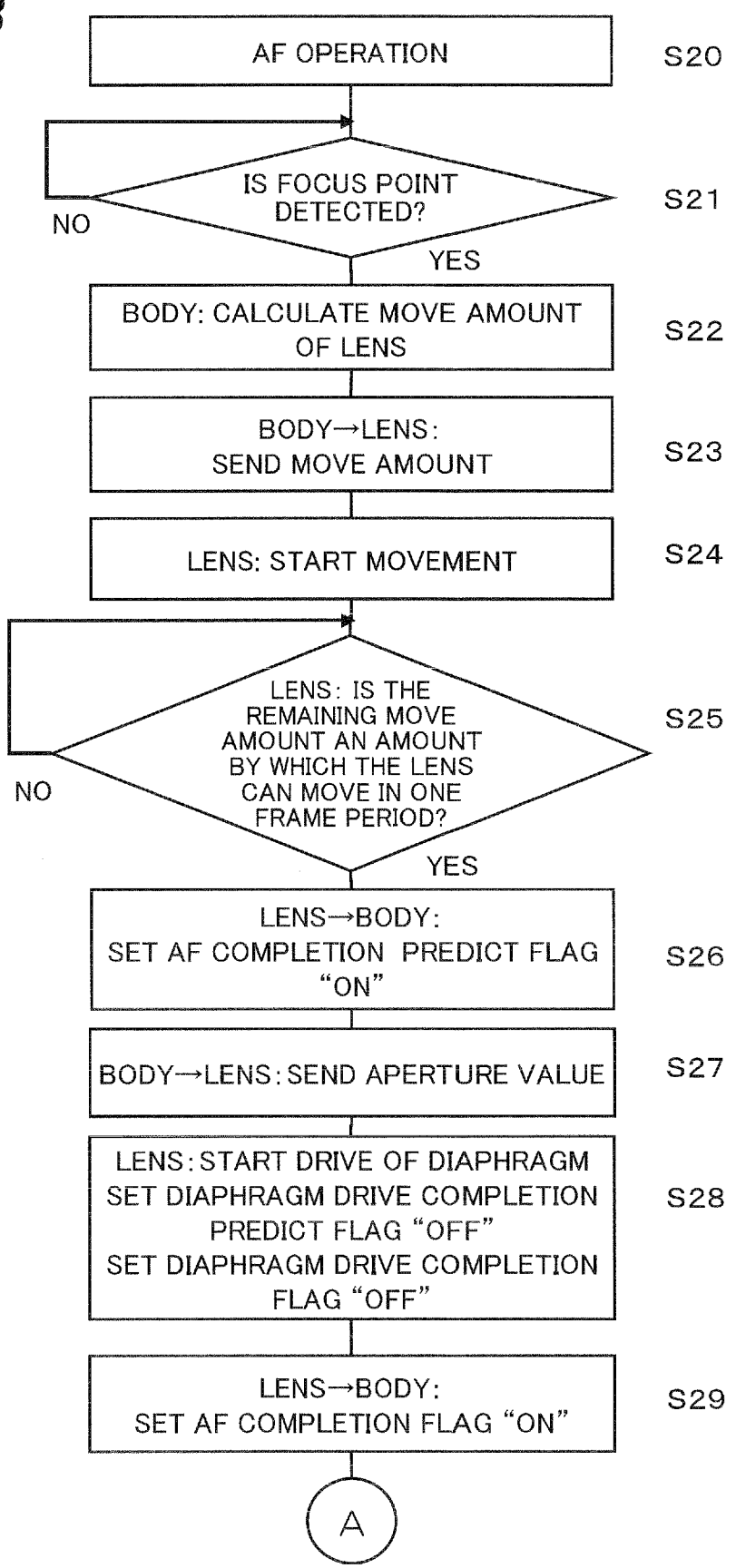
FIG. 3 is a flowchart for describing an autofocus operation.

In the flowchart in FIG. 3, when an autofocus operation is performed by the user (S20), the camera system 1 begins to detect a focus point by driving the focus lens 230 (S21).

When a focus point is detected, then the camera controller 140 obtains the current position information of the focus lens 230 from the lens controller 240 and calculates an amount of movement by which the focus lens 230 is to move (S22). When the amount of movement is calculated, the camera controller 140 sends a command about the amount of movement of the focus lens 230 to the lens controller 240 through the body mount 150 and the lens mount 250 (S23 and time t1). Note that it is not a necessary configuration that the camera controller 140 sends the amount of movement to the lens controller 240. For example, it may be configured such that information about a position on the optical axis to which the focus lens 230 is to move is sent to the lens controller 240.

When the command about the amount of movement is received, the lens controller 240 controls the focus motor 233 to move the focus lens 230 based on the obtained command (S24 and time t2). Note that this control is performed in synchronization with an exposure synchronizing signal which is sent next to an exposure synchronizing signal which is sent when the command about the amount of movement is sent. In this manner, a shift to control of the focus motor 233 is smoothly performed from control when the command is obtained. In addition, at the same time as the start of movement of the focus lens 230, the lens controller 240 turns off an autofocus drive completion prediction flag (hereinafter, referred to as the "AF completion prediction flag") and an autofocus drive completion flag (hereinafter, referred to as the "AF completion flag") (sets the flags OFF) (time t2 in FIG. 5). Note that it not necessary configuration that the lens controller 240 turns off the AF completion prediction flag and the AF completion flag at the same time as the start of movement of the focus lens 230. For example, it may be configured such that the AF completion prediction flag and the AF completion flag are turned off at the same time as when the command is obtained.

As used herein, the AF completion prediction flag is a flag announcing that the autofocus operation will be completed within a predetermined time from the present time. In this case, the predetermined time is set to a time equivalent to a time (one frame period) required for the CCD image sensor 110 to capture a one-frame image. One frame period corresponds to, for example, a vertical transfer period of the CCD image sensor 110. The AF completion flag is a flag indicating that the autofocus operation has been actually completed.

Even after the start of movement of the focus lens 230, the camera controller 140 and the lens controller 240 communicate with each other and commands about the drive of the focus lens 230, and the like, are exchanged there between. The communication of commands is performed at timing synchronized with an exposure synchronizing signal sent to the lens controller 240 from the camera controller 140. For example, the interchangeable lens 200 sends, to the camera body 100, a command including information about a current position of the focus lens 230, a current position of the zoom lens 210, an aperture state of the diaphragm 260, or states various flags, and the like.

The camera body 100 sends, to the interchangeable lens 200, a command including information about a target position of the focus lens 230, a command including information about the drive speed of the focus lens 230, and the like. Note that the lens controller 240 counts, by the counter 243, the number of pulse signals sent to the focus motor 233 after the start of movement of the focus lens 230. In this manner, a driving state of the focus lens 230, such as current position and driving speed, can be detected.

When the movement of the focus lens 230 starts, the lens controller 240 determines (predicts) whether the movement of the focus lens 230 will be completed within the predetermined time from the present time (S25). Specifically, it is determined whether a remaining amount of movement at the present time is an amount by which the focus lens 230 can move within the predetermined time (S25). In this case, the predetermined time is set to one frame period. In a word, the lens controller 240 determines whether the operation of the focus lens 230 will be completed in the next cycle of the exposure synchronizing signal. Note that it can be determined whether the movement of the focus lens 230 will be completed within the predetermined time by grasping the driving speed of the focus lens 230 and the count of the counter 243.

Figure 5:
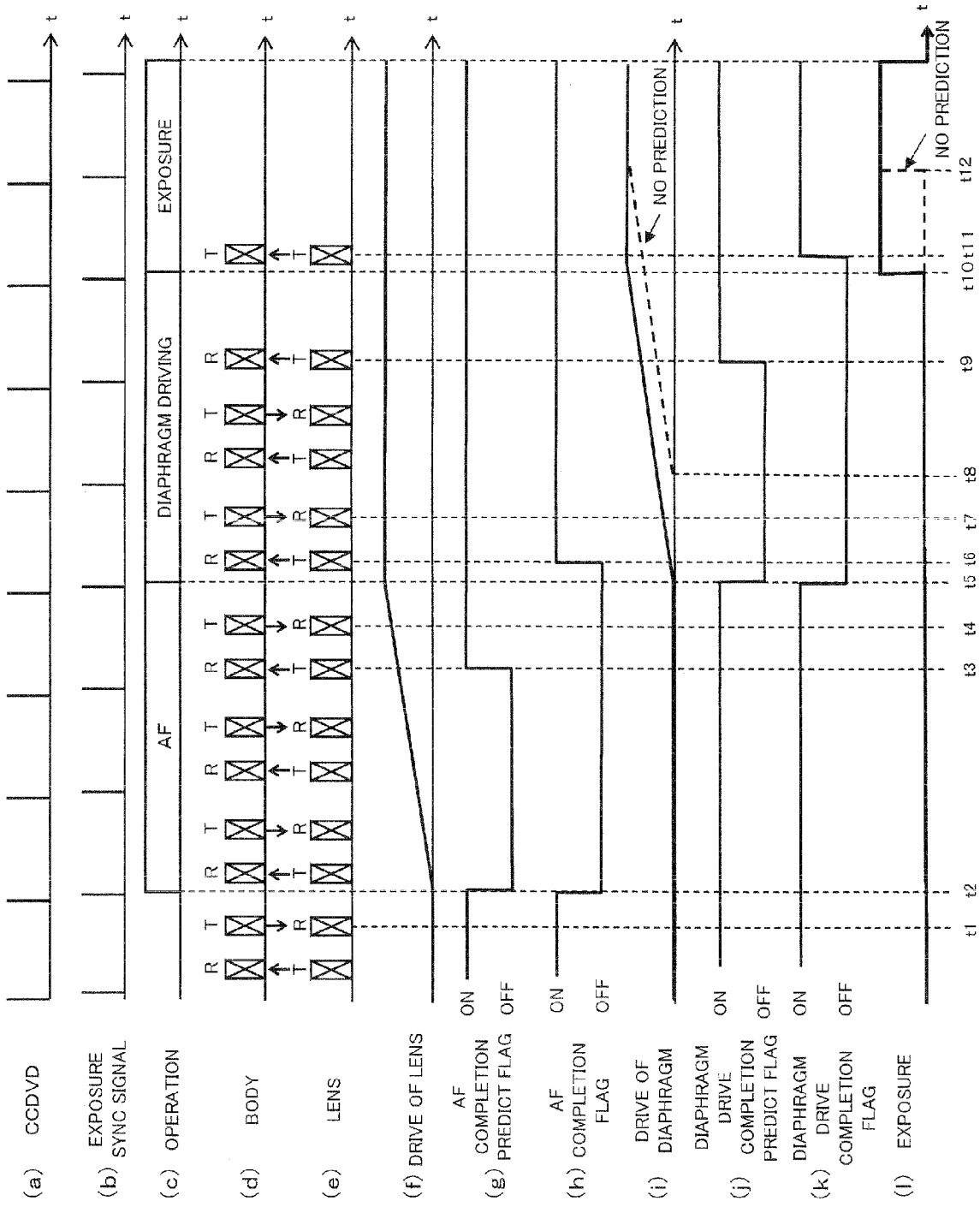
FIG. 5 is a timing chart for describing operations ranging from an AF operation to exposure.

When it is determined (predicted) that the movement of the focus lens 230 will be finished within the predetermined time, the lens controller 240 turns on the AF completion prediction flag announcing that the autofocus operation will be completed within the predetermined time (S26 and time t3 in FIG. 5). The camera controller 140 receives the AF completion prediction flag from the lens controller 240 and can detect, based on the AF completion prediction flag, that the autofocus operation will be completed within the predetermined time.

Note that at this time of determination, the completion of the movement of the focus lens 230 is only predicted and thus the actual movement of the focus lens 230 is not completed yet.

In the present embodiment, since the focus motor 233 is configured by a stepping motor, the lens controller 240 can determine whether the movement of the focus lens 230 will be completed within the predetermined time from the present time. However, there may possibly be a case in which an interchangeable lens having, as a focus motor, a motor (e.g., a DC motor) that cannot determine whether drive of a focus lens will be completed within the predetermined time from the present time is mounted to the camera body 100 of the present embodiment. In such a case, the lens controller 240 does not turn on an AF completion prediction flag before AF is fully completed.

When the AF completion prediction flag is received from the lens controller 240, the camera controller 140 sends a command including information about a target aperture value used in aperture control to be performed subsequent to the autofocus control, to the lens controller 240 through the body mount 150 and the lens mount 250 (S27 and time t4 in FIG. 5).

When the lens controller 240 receives the command including information about a target aperture value, the lens controller 240 controls the diaphragm motor 261 to start the drive of the diaphragm 260 at next synchronous drive timing (S28 and time t5 in FIG. 5).

The lens controller 240 turns off a diaphragm drive completion prediction flag and a diaphragm drive completion flag (sets the flags OFF) at the same time as the start of the drive of the diaphragm 260. The diaphragm drive completion prediction flag flag announcing that the drive of the diaphragm will be completed within a predetermined time from the present time. In this case, the predetermined time is a time equivalent to a time (one frame period) required for the CCD image sensor 110 to capture a one-frame image, and corresponds to, for example, a vertical transfer period of the CCD image sensor 110. The diaphragm drive completion flag is a flag indicating that the diaphragm drive has been actually completed. In the present embodiment, the diaphragm drive completion prediction flag and the diaphragm drive completion flag are turned off (set to OFF) every time diaphragm drive is performed. Accordingly, before the diaphragm drive is finished, each flag is always turned off (set to OFF). Note that it is not a necessary configuration that the lens controller 240 turns off the diaphragm drive completion prediction flag and the diaphragm drive completion flag at the same time as the start of the drive of the diaphragm 260. For example, it may be configured such that, the diaphragm drive completion prediction flag and the diaphragm drive completion flag are turned off at the same time when the command is obtained.

The lens controller 240 turns on the AF completion flag indicating that the movement of the focus lens 230 has been completed (sets the flag ON), at the first command send timing after the start of the control of the diaphragm motor 261 (S29 and time t6 in FIG. 5). The camera controller 140 receives the AF completion flag through the lens mount 250 and the body mount 150 and can detect that the movement of the focus lens 230 has been completed, by referring to the AF completion flag.

Note that when an interchangeable lens having, as a focus motor, a motor (e.g., a DC motor) that cannot determine whether the drive of a focus lens will be completed within the predetermined time from the present time is mounted to the camera body 100 according to the present embodiment, an AF completion prediction flag and an AF completion flag are simultaneously turned on (set to ON) at time t6. With this control, the camera body 100 can support both an interchangeable lens that can predict in advance the completion of an autofocus operation and an interchangeable lens that cannot predict in advance the completion of an autofocus operation.

As described above, in the present embodiment, the fact that an autofocus operation will be completed within the predetermined time is predicted and detected. Then, when detected, an AF completion prediction flag is turned on. In this manner, the interchangeable lens 200 can notify the camera body 100 that the autofocus operation will be completed within the predetermined time from the present time. As a result, the camera body 100 can instruct another control before the autofocus operation is completed.

Then, in the present embodiment, the camera body 100 sends a command including information about a target aperture value, to the interchangeable lens 200 at a next timing for sending a command after the AF completion prediction flag is obtained. In this manner, the interchangeable lens 200 can shift to a drive operation of the diaphragm 260 immediately after the completion of the autofocus operation. As a result, the camera system according to the present embodiment can smoothly shift from autofocus control to next control.

For example, when an AF completion prediction flag as provided in the present embodiment is not provided, the camera controller 140 cannot shift to next control until the completion of an autofocus operation is actually detected. Thus, the camera controller 140 has to send to the lens controller 240 a command including information about a target aperture value used in aperture control, after time t6 at which the completion of an autofocus operation is actually detected, i.e., time t7. In that case, the lens controller 240 starts control of the diaphragm motor 261 in a cycle next to an exposure synchronization cycle (control cycle) including time t7 at which the command including information about a target aperture value used aperture control is received, i.e., time t8. Hence, the start of diaphragm drive is delayed by (t8–t5) compared to the case of providing an AF completion prediction flag. By providing an AF completion prediction flag and predicting the completion of an autofocus operation by referring to the AF completion prediction flag, as in the present embodiment, next control can start before the movement of the focus lens 230 is actually completed, enabling a shift of control in the camera system 1 performed by the camera controller 140 at an earlier timing.

1-2-2-2. Aperture Control

Aperture control performed subsequent to the completion of the above-described autofocus operation will be described with reference to a flowchart in FIG. 4 and FIG. 5.

Figure 4:
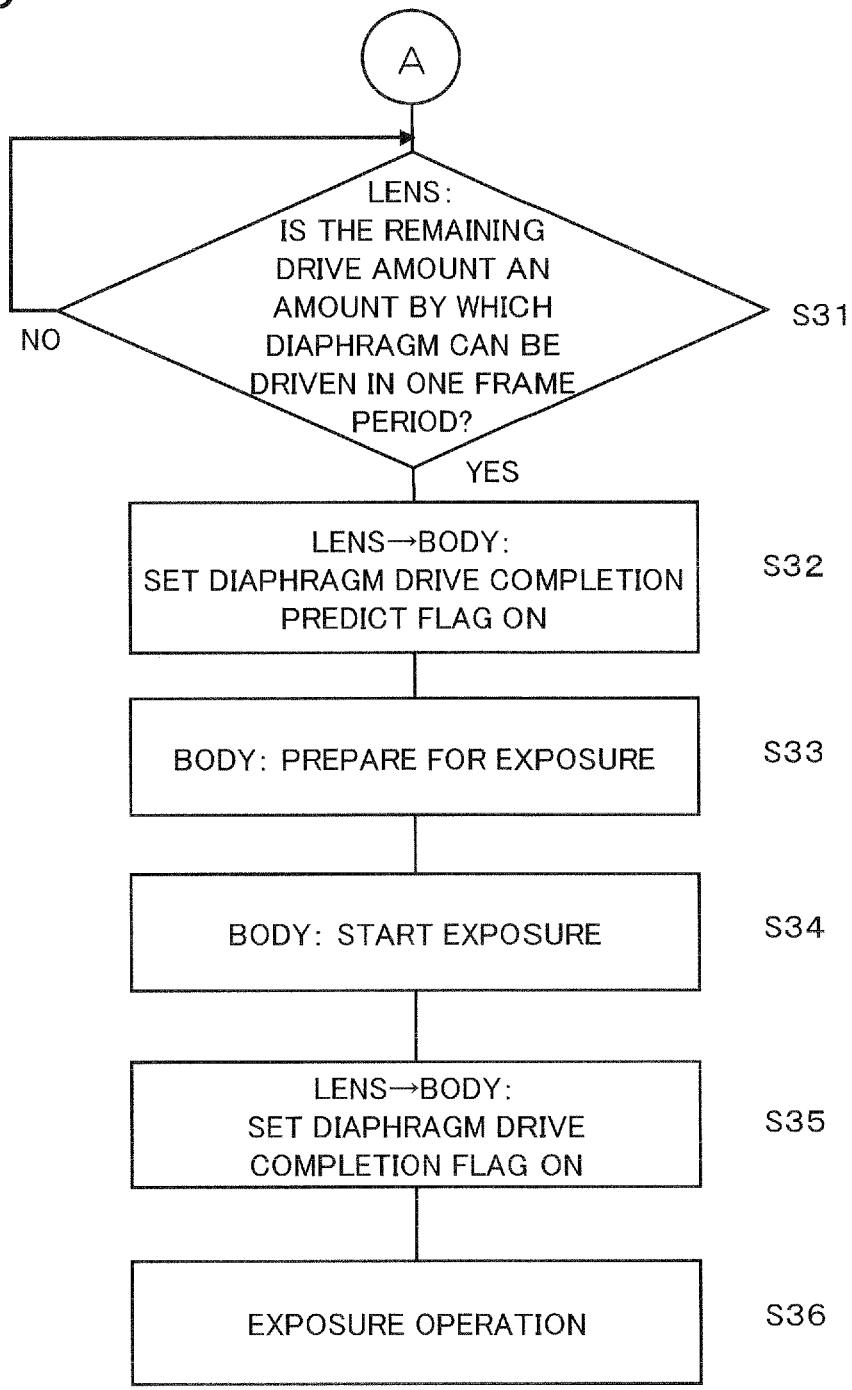
FIG. 4 is a flowchart for describing an operation of a diaphragm.

In FIG. 4, when the lens controller 240 detects that the AF completion flag is turned on, the lens controller 240 determines whether the drive of the diaphragm 260 to a target aperture value will be completed within a predetermined time (S31). In this case, the predetermined time is a time equivalent to one frame period.

When it is determined that the drive of the diaphragm 260 will be completed within the predetermined time, then the lens controller 240 turns on a diaphragm drive completion prediction flag (sets the flag ON) (S33 and time t9). The camera controller 140 can thus detect that the diaphragm drive will be completed within the predetermined time, by referring to the diaphragm drive completion prediction flag.

After the diaphragm drive completion prediction flag is turned on, the camera controller 140 prepares for an exposure operation to be performed by the CCD image sensor 110 (S33). When the preparation for an exposure operation is completed, the camera controller 140 causes the CCD image sensor 110 to start an exposure operation at next operation timing (S34 and time t10).

Thereafter, the lens controller 240 turns on a diaphragm drive completion flag (sets the flag ON) at next command send timing (S35 and time t11). Thus, the camera controller 140 can detect that the diaphragm drive has been completed, through the lens mount 250 and the body mount 150.

Thereafter, the camera controller 140 causes the CCD image sensor 110 to continuously perform the exposure operation (S36).

As described above, according to the present embodiment, it is predicted that diaphragm drive will be completed within the predetermined time and a diaphragm drive completion prediction flag is set. The interchangeable lens 200 can notify the camera body 100 that the diaphragm drive will be completed within the predetermined time from the present time, with the diaphragm drive completion prediction flag. As a result, the camera body 100 can start preparation for another control before the diaphragm drive is actually completed and thus can smoothly shift to another control.

For example, when it is predicted that diaphragm drive will be completed, the camera body 100 can start preparation for an exposure operation for the CCD image sensor 110 without waiting for the diaphragm drive to be actually completed. Thus, the camera body 100 can shift control to an exposure operation performed by the CCD image sensor 110, immediately after the actual completion of the diaphragm drive. As a result, the camera body 100 can smoothly shift from diaphragm drive control to next control.

For example, when a diaphragm drive completion prediction flag is not provided, the camera controller 140 can shift to next control only after detecting the actual completion of diaphragm drive. Thus, in the case of the example in FIG. 5, the camera controller 140 starts preparation for an exposure operation at or after time t11 at which the camera controller 140 can detect that the drive of the diaphragm 260 has been actually completed, and the start timing for the exposure operation is also timing at or after time t11 (e.g., time t12). In contrast to this, when a diaphragm drive completion prediction flag is provided, as described above, preparation for an exposure operation can start after time t9 and thus the exposure operation can start early (time t10). Hence, when a diaphragm drive completion prediction flag is not provided, the start of an exposure operation is delayed by (t12–t10) compared to the case of providing a diaphragm drive completion prediction flag. By thus providing a diaphragm drive completion prediction flag and predicting the completion of diaphragm drive by referring to the diaphragm drive completion prediction flag, next control can start before the diaphragm drive is actually completed, enabling a shift to control in the camera system 1 performed by the camera controller 140 at an earlier timing.

The present embodiment sets a flag (completion prediction flag) indicating result of a prediction about the completion of drive of an optical member, such as an AF completion prediction flag and a diaphragm drive completion prediction flag, and a flag (completion flag) indicating the actual completion of drive of the optical member, such as an AF completion flag and a diaphragm drive completion flag. With such a completion flag, the state of the optical member can be properly grasped. Accordingly, the completion flag is useful for switching from synchronous control to asynchronous control performed between the camera body 100 and the interchangeable lens 200, or an asynchronous process performed between the camera body 100 and the interchangeable lens 200. For example, when switching from synchronous control to asynchronous control is performed between the camera body 100 and the interchangeable lens 200, a stationary state of an optical member can be properly grasped by referring to a completion flag. Thus, after the stationary state is confirmed, switching from synchronous control to asynchronous control can be performed.

2. Other Embodiments

Although in the first embodiment an AF completion prediction flag or a diaphragm drive completion prediction flag is used to notify the camera body 100 from the interchangeable lens 200 that the drive of the focus lens 230 or the diaphragm 260 will be completed to be used, the information is not necessarily limited thereto. That is, any type of information may be used as long as it can allow the interchangeable lens 200 to notify the camera body 100 that the drive of the focus lens 230 will be completed. For example, for information notifying that the drive of the focus lens 230 or the diaphragm 260 will be completed, information (seconds) indicating the elapsed time required to complete the drive, information indicating the number of frames required to complete the drive, or information indicating predicted timing of the completion of the drive may be used.

Although in the first embodiment the prediction flag is set in the interchangeable lens 200, the prediction flag may be set in the camera body 100. In this case, the camera controller 140 may operate as follows. The camera controller 140 obtains, during the image capturing preparation operation, information about driving speeds of the focus lens 230 and the diaphragm 260 included in the lens data, from the lens controller 240. The camera controller 140 obtains information about the position of the focus lens 230 and a degree of opening of the diaphragm 260 at the present time, from the lens controller 240 before performing autofocus control and aperture control. Then, the camera controller 140 determines (predicts) whether the movement of the focus lens 230 will be completed within a predetermined time from the present time, based on the drive speed of the focus lens 230 obtained during the image capturing preparation operation and the position of the focus lens 230 at the present time, and sets an AF completion prediction flag. Likewise, the camera controller 140 sets a diaphragm drive completion flag based on the drive speed of the diaphragm 260 obtained during the image capturing preparation operation and the degree of opening at the present time.

Although in the first embodiment a predetermined time used to predict the completion of drive in the setting of an AF completion prediction flag and a diaphragm drive completion prediction flag is one frame period, the predetermined time is not limited thereto. The predetermined time may be a time required for the CCD image sensor 110 to capture images for n frames (n=2, 3, 4, ... ). The predetermined time may also be indicated in units of frames or units of time (e.g., seconds).

Although in the first embodiment the configuration is such that aperture control is performed subsequent to autofocus control, such a configuration does not necessarily need to be employed. Subsequent to autofocus control, autofocus control may be performed again or an exposure operation may be performed.

Although in the first embodiment the focus lens 230 and the diaphragm 260 are exemplified as the target to predict the completion of drive, such a configuration does not necessarily need to be employed. The idea of the first embodiment can be applied to any drivable and movable member.

Although in the first embodiment the configuration is such that an AF completion flag or diaphragm drive completion flag is set to ON after the completion of drive of a movable member, such a configuration does not necessarily need to be employed. If an AF completion prediction flag or diaphragm drive completion prediction flag is set to ON, an AF completion flag or diaphragm drive completion flag does not necessarily need to be set to ON.

Although in the first embodiment a configuration including the zoom lens 210 and the OIS lens 220 is exemplified, they are not essential elements. In other words, the idea of the first embodiment can also be applied to a camera system which includes a single focus lens having no zoom function. Moreover, the idea of the first embodiment can also be applied to a camera system to which an interchangeable lens without a camera shake correction function is mounted.

Although in the first embodiment a camera body without a movable mirror is exemplified, the configuration of the camera body is not limited thereto. For example, a movable mirror may be included in the camera body or a prism for splitting a subject image may be included in the camera body. Alternatively, the configuration may be such that a movable mirror is included in an adapter instead of in the camera body.

Although in the first embodiment the CCD image sensor 110 is exemplified as an imaging device, the imaging device is not limited thereto. For example, the imaging device may be configured by a CMOS image sensor or NMOS image sensor.

Although specific embodiments have been described above, many other variants, modifications, and other uses are obvious to those skilled in the art. Therefore, the present invention is not limited to the specific disclosure made herein and can only be limited by the appended claims. Note that the present application relates to Japanese Patent Application No. 2008-128010 (filed May 15, 2008), the content of which is incorporated herein by reference.

INDUSTRIAL APPLICABILITY

The present invention can be applied to a lens interchangeable type camera system. Specifically, the present invention can be applied to a digital still camera, a digital movie camera, and the like.

DESCRIPTION OF THE REFERENCE NUMERALS

1: Camera system
100: Camera body
110: CCD image sensor
112: Timing generator
130: Release button
140: Camera controller
200: Interchangeable lens
230: Focus lens
233: Focus motor
240: Lens controller
260: Diaphragm

The invention claimed is:

1. A camera system comprising an interchangeable lens and a camera body,
the camera body comprising:
a body controller configured to generate a synchronizing signal and a command; and
a sending unit configured to send the generated synchronizing signal and command to the interchangeable lens,
the interchangeable lens comprising:
a movable member;

a driving unit configured to drive the movable member;
a receiving unit configured to receive a synchronizing signal and a command from the camera body; and
a lens controller configured to control the driving unit according to the received command based on the received synchronizing signal,
a prediction unit configured to generate prediction information while the driving unit drives the movable member, the prediction information indicating whether an operation of the driving unit of the interchangeable lens according to the received command will be completed within a predetermined time;
a sending unit configured to send the prediction information to the camera body.

2. The camera system according to claim 1, wherein the prediction information is flag information indicating whether the operation of the driving unit of the interchangeable lens that is performed according to the received command will be completed within the predetermined time.

3. The camera system according to claim 1, wherein the prediction information is information indicating a time required to complete the operation, of the driving unit, that is performed according to the received command.

4. The camera system according to claim 1, wherein the prediction information is information indicating a timing at which the operation, of the drive unit, that is performed according to the received command is completed.

5. The camera system according to claim 1, wherein when it is predicted, based on the prediction information generated by the prediction unit, that the operation of the driving unit that is performed according to the received command in the interchangeable lens will be completed within the predetermined time, the body controller starts, in advance, control of an operation of at least one of the camera body and the interchangeable lens to be performed after completion of the operation of the driving unit which is being currently controlled.

6. The camera system according to claim 1, wherein the prediction information is information indicating the number of cycles of the synchronizing signal required to complete the operation, of the driving unit, that is performed according to the received command.

7. The camera system according to claim 1, wherein the prediction unit generates the prediction information based on the synchronizing signal received from the camera body.

8. An interchangeable lens mountable to a camera body comprising:
a movable member;
a driving unit configured to drive the movable member;
a receiving unit configured to receive a synchronizing signal and a command from the camera body;
a lens controller configured to control the driving unit according to the received command based on the received synchronizing signal;
a prediction unit configured to generate prediction information while the driving unit drives the movable member, the prediction information indicating whether an operation of the driving unit, which is performed according to the received command, will be completed within a predetermined time; and
a sending unit configured to send the prediction information to the camera body.

9. The camera system according to claim 8, wherein the prediction unit generates the prediction information based on the synchronizing signal received from the camera body.

10. A camera system comprising an interchangeable lens and a camera body,
the camera body comprising:
a body controller configured to generate a synchronizing signal and a command; and
a sending unit configured to send the generated synchronizing signal and the command to the interchangeable lens,
the interchangeable lens comprising:
a movable member;
a driving unit configured to drive the movable member;
a receiving unit configured to receive the synchronizing signal and the command from the camera body;
a lens controller configured to control the driving unit according to the received command based on the received synchronizing signal; and
a prediction unit configured to generate prediction information while the driving unit drives the movable member, the prediction information indicating whether an operation of the driving unit, which is performed according to the received command, will be completed within a predetermined time;
wherein the lens controller sends the prediction information generated by the prediction unit to the camera body, and
the prediction information is information indicating a number of cycles of the synchronizing signal required to complete the operation of the driving unit which is performed according to the received command.

11. The camera system according to claim 10, wherein the lens controller controls the driving unit according to the command after a predetermined number of cycles elapses from a cycle of the synchronizing signal at which the command is received.

12. The camera system according to claim 10, wherein the prediction unit generates the prediction information based on the synchronizing signal received from the camera body.

* * * * *